United States Patent [19]
Curtis et al.

[11] Patent Number: 6,021,328
[45] Date of Patent: Feb. 1, 2000

[54] RADIO LINK QUALITY HANDOFF TRIGGER

[75] Inventors: David E. Curtis; William B. Book, both of Allen; David A. Boettger, Richardson; Ahmad Jalali, Plano, all of Tex.

[73] Assignee: Northern Telecom Limited, Montreal, Canada

[21] Appl. No.: 08/769,650

[22] Filed: Dec. 19, 1996

[51] Int. Cl.[7] .............................. H04Q 7/22; H04Q 7/36
[52] U.S. Cl. .................. 455/443; 455/436; 455/439; 455/440
[58] Field of Search ................................ 455/436, 437, 455/438, 439, 440, 441, 442, 443, 444, 422; 370/328, 331, 332, 342

[56] References Cited

U.S. PATENT DOCUMENTS

| | | |
|---|---|---|
| 5,313,489 | 5/1994 | Menich et al. . |
| 5,548,808 | 8/1996 | Bruckert et al. .................... 455/33.2 |
| 5,557,657 | 9/1996 | Barnett ................................. 455/444 |
| 5,594,718 | 1/1997 | Weaver, Jr. et al. ................. 370/331 |
| 5,640,414 | 6/1997 | Blakeney, II et al. . |
| 5,640,677 | 6/1997 | Karlsson ............................. 455/434 |
| 5,649,308 | 7/1997 | Andrew . |
| 5,697,055 | 12/1997 | Gilhoussen et al. ................. 455/436 |
| 5,727,033 | 3/1998 | Weaver, Jr. et al. ................. 375/358 |
| 5,732,347 | 3/1998 | Bartle et al. ......................... 455/421 |
| 5,784,406 | 7/1998 | Dejaco et al. ....................... 375/224 |

FOREIGN PATENT DOCUMENTS

| | | |
|---|---|---|
| 95302771 | 4/1995 | European Pat. Off. . |
| WO 90/13187 | 11/1990 | WIPO . |
| WO 95/04423 | 2/1995 | WIPO . |
| WO 95/12297 | 4/1995 | WIPO . |
| WO 95/31880 | 11/1995 | WIPO . |

*Primary Examiner*—Dwayne D. Bost
*Assistant Examiner*—Alan Gantt
*Attorney, Agent, or Firm*—Haynes and Boone, L.L.P.

[57] ABSTRACT

A method and system is disclosed for triggering handoff of a call from a CDMA network to an AMPS network on which it is overlaid responsive to a determination that the CDMA RF link has degraded to such an extent that the call quality will be degraded significantly or the call is likely to be dropped is disclosed. A handoff of a call from a CDMA network to an AMPS network if, at a given time: (1) the number of forward link erasures is greater than a first maximum number of forward link erasures; or (2) the number of reverse link erasures is greater than a first maximum number of forward link erasures; or (3) the number of forward link erasures is greater than a second maximum number of forward link erasures and the forward traffic channel gain is greater than a maximum forward traffic channel gain; or (4) the number of reverse link erasures is greater than a second maximum number of reverse link erasures and the ratio of energy per bit to noise power spectral density on the reverse link ("EB/NO") is greater than a maximum EB/NO. In alternative embodiments, the present invention may be used to trigger handoff of a call from a first CDMA cell site to a second CDMA cell site or to an AMPS cell site serving a cell on which the cell served by the first CDMA cell site is not overlaid.

22 Claims, 4 Drawing Sheets

RADIO LINK QUALITY HANDOFF TRIGGER

TECHNICAL FIELD

The invention relates generally to cellular telephone systems and, more particularly, to a method of triggering a handoff of a call from a cell site in a first cellular telephone network, such as a code division multiple access ("CDMA") network, to a cell site in a second cellular telephone network, such as an advanced mobile phone service ("AMPS") network.

BACKGROUND OF THE INVENTION

In cellular telephone systems, the served area is divided into cells, each of which may be further divided into sectors. Each cell is served by a single base station, or cell site, and each base station is connected to a message switching center ("MSC") via appropriate hardware links. A mobile unit is connected to the MSC by establishing a radio frequency ("RF") link with a nearby cell site.

Currently, there are several different types of cellular access technologies for implementing a cellular telephone network, including, for example, code division multiple access, or "CDMA", and advanced mobile phone service, or "AMPS". In a CDMA network, a single radio frequency is used simultaneously by many mobile units and each mobile unit is assigned a "code" for deciphering its particular traffic on that frequency. In contrast, in an AMPS network, each mobile unit is assigned a different radio frequency on which to communicate.

Referring to FIGS. 1A–1D, it will be recognized that, as shown in FIG. 1A, in order for a mobile unit, such as the mobile unit 10, to communicate in a cellular telephone network, designated generally by a reference numeral 12, two links must be established, including an RF link 14 between the mobile unit 10 and a first cell site, such as a cell site A, and a hardware link 16 between the cell site and a mobile switching center ("MSC") 18. As shown in FIG. 1B, as the mobile unit 10 moves away from the cell site A, the RF link 14 will eventually become too weak to support communications between the cell site A and the mobile unit 10 and will eventually disconnect, resulting in the call in progress being dropped. Clearly, this is not acceptable. Accordingly, as illustrated in FIGS. 1C and 1D, to avoid this result, as the mobile unit 10 nears a second cell site, in this case, a cell site B, a new communications path between the mobile unit 10 and the MSC 18, comprising an RF link 20 and a hardware link 22 between the cell site B and the MSC 18, is established. At this point, the mobile unit 10 is directed to end communication with the cell site A and begin communication with the cell site B.

Although as shown in FIGS. 1A–1D, the cell sites are connected by a single MSC 18, it will be recognized that cell sites may be connected by more than one MSC connected to one another via appropriate links. Moreover, the cell sites A and B may be located in two separate cellular telephone networks, such as a CDMA and an AMPS network, respectively, or in two different CDMA networks.

The situation in which a mobile unit ends communication with one cell site and begins communication with a second cell site, is referred to as a "handoff". The specific example illustrated in FIGS. 1A–1D is referred to as a "hard handoff", because the link between the mobile unit 10 and the MSC 18 via the cell site A is broken before the link between the mobile unit and the MSC via the cell site B is established.

In many cases, an AMPS cellular network already exists in an area in which a CDMA network is to be installed, in which case the CDMA network will often be overlaid on top of the AMPS network. In such cases, it is conceivable that there will be situations in which it would be advantageous to effect the handoff of a call from a CDMA cell site to an AMPS cell site. For example, it is possible that there will be areas that are covered by the AMPS network that are not covered by the CDMA network, due to different propagation characteristics of the two technologies, slight differences in the location of the various cell sites, and holes, or nulls, in the CDMA network coverage due to topography and cell site planning. Such coverage holes in the CDMA network can degrade call quality and, at worst, result in dropped calls. In addition, many cellular service providers have existing in-building and/or underground AMPS network coverage. The RF propagation characteristics of an 800 MHz signal in an AMPS network may be able to penetrate such structures better than a 1900 MHz signal in a CDMA network; therefore, a call maintained by the CDMA network could lose quality or be dropped. Finally, because large urban areas are typically converted to CDMA before rural areas, the major highways between such areas will also be converted to CDMA, to provide seamless coverage for travelers between such areas. However, as a mobile unit exits the highway, it also exits CDMA coverage area, eventually resulting in a call-in-progress being dropped.

In the foregoing situations, it would be beneficial to handoff a call from a CDMA network to an AMPS network on which it is overlaid once the call has degraded to a point at which it appears that the call will eventually be dropped.

It will be appreciated that CDMA network service providers would like to maintain a call within the CDMA network rather than hand it off to an AMPS network, as handing off a call too soon results in lost revenue for the CDMA network service provider; however, waiting too long to do so will likely result in a decrease in call quality and an increase in dropped calls, both of which result in an increase in customer complaints.

Therefore, what is needed is a method of triggering handoff of a call from a CDMA cell site to a second cell site, such as an AMPS cell site, responsive to a determination that the RF link between the mobile unit and the CDMA cell site has degraded to such an extent that a disconnection of the link is imminent.

SUMMARY OF THE INVENTION

The present invention, accordingly, provides a method and system for triggering handoff of a call from a CDMA network to an AMPS network on which it is overlaid responsive to a determination that the CDMA RF link has degraded to such an extent that the call quality will be degraded significantly or the call is likely to be dropped. A handoff of a call from a CDMA network to an AMPS network is triggered by one of the following four conditions being met:

(1) $FER_{forward}(t) > FER_{max\_forward}$ (2) $FER_{reverse}(t) > FER_{max\_reverse}$ (3) $FER_{forward}(t) > FER_{max\_forward\_2}$ and $TCG(t) > TCG_{max}$ (4) $FER_{reverse}(t) > FER_{max\_reverse\_2}$ and $EBNO(t) > EBNO_{max}$ where $FER_{forward}(t)$ represents a measure of the quality of the forward link over a given window of time, $FER_{reverse}(t)$ is a measure of the quality of the reverse link over a given window of time, $TCG(t)$ is a measure of the power being sent to the mobile unit on the forward link over a given window of time, and $EBNO(t)$ is a ratio of energy per bit to noise power spectral density used in power control to ensure that the reverse link meets the target frame error rate over a given window of time.

In alternative embodiments, the handoff trigger described herein may be used to trigger handoff of a call from a first CDMA cell site serving a first CDMA cell to a second CDMA cell site serving a second CDMA cell or to an AMPS or other cell site serving an AMPS cell on which said first CDMA cell is not overlaid.

A technical advantage achieved is that, in a CDMA network that is overlaid on an AMPS network, CDMA calls that would otherwise be severely degraded or dropped due to a poor CDMA RF link can be handed off to AMPS instead.

Another technical advantage achieved with the invention is that it optimizes the time at which a call is handed off from a first cell site to a second cell site.

Yet another technical advantage achieved with the invention is that it enables a call to be handed off to another cell site as soon as the RF link between the mobile unit and a CDMA cell site has degraded to such an extent that the quality of the call has been degraded beyond an acceptable level or the call is likely to be dropped.

DESCRIPTION OF THE PREFERRED EMBODIMENT

FIGS. 1A–1D illustrate hard handoff of a call from one cell site to another, as described in detail above.

Figure 1A:
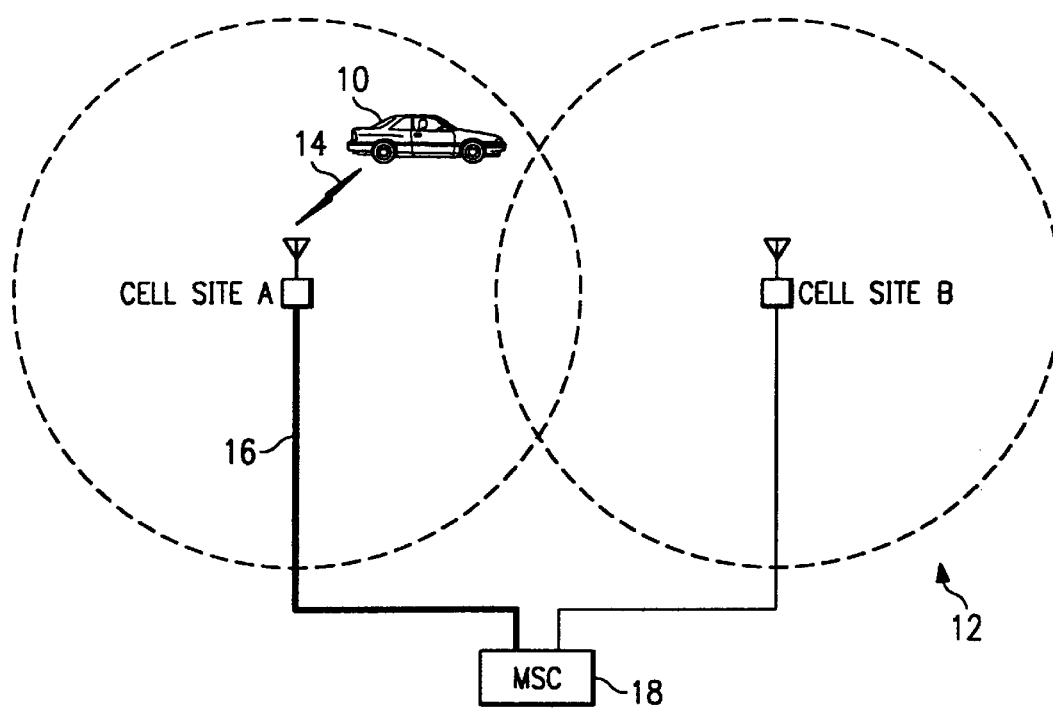
FIGS. 1A–1D illustrate hard handoff of a call from one cell site to another.
Figure 1B:
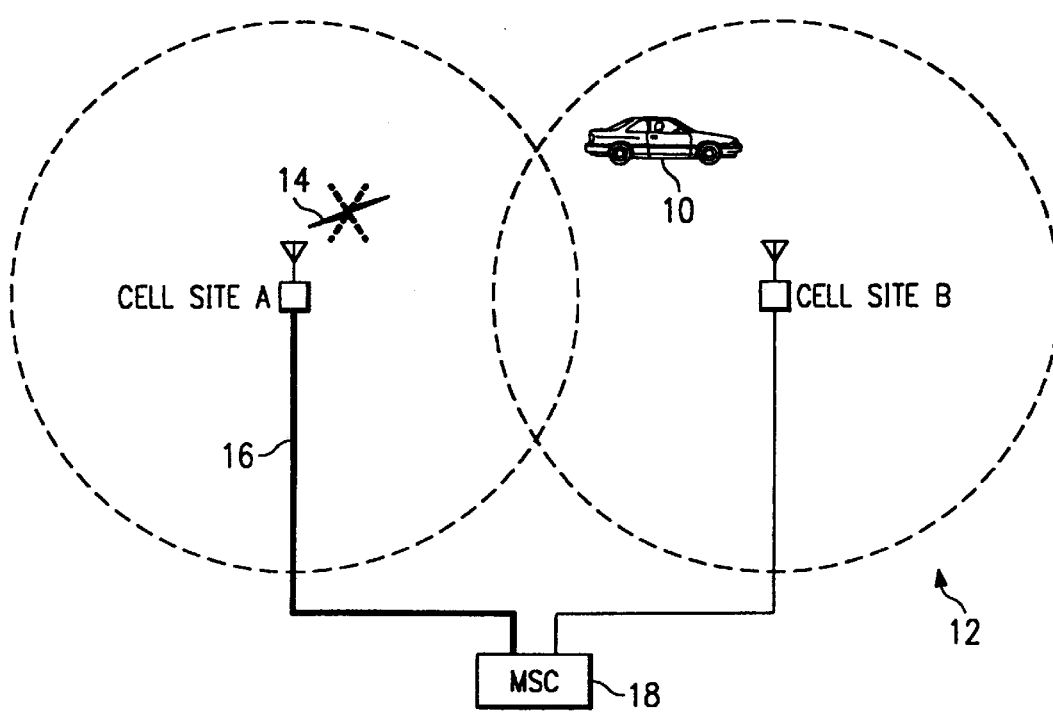
Figure 1C:
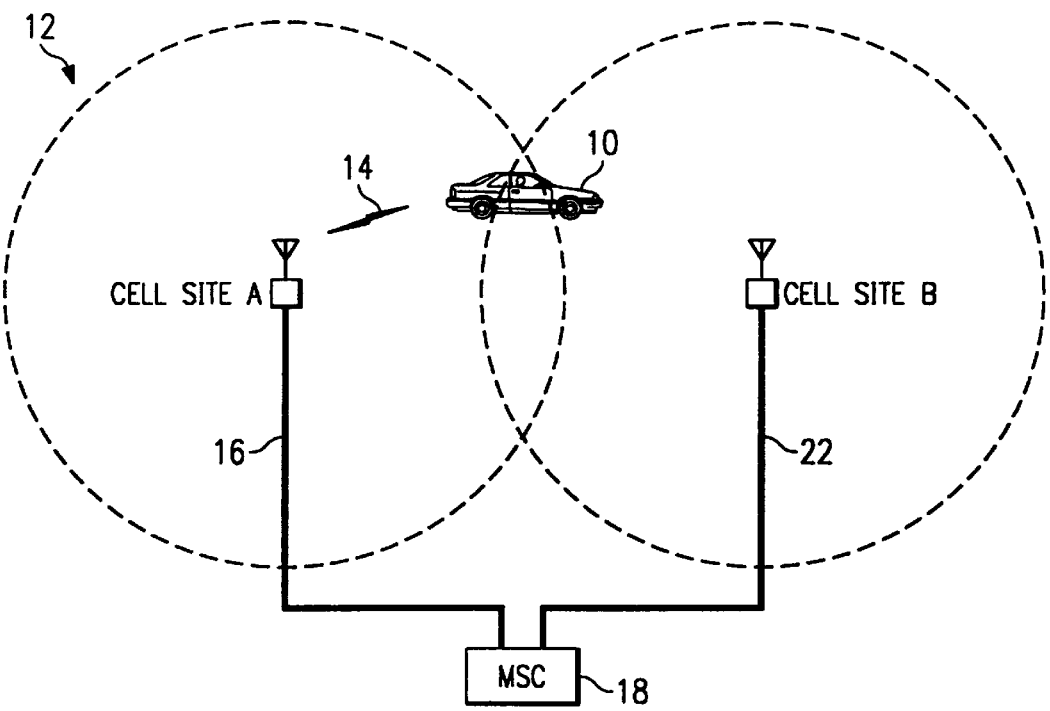
Figure 1D:
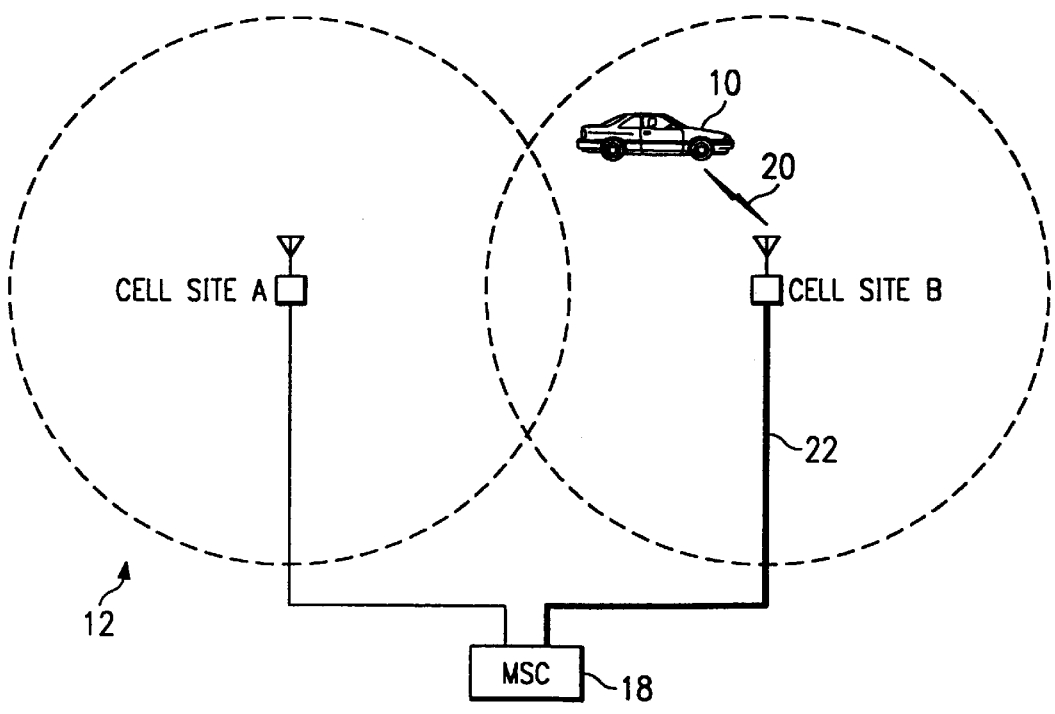
Figure 2A:
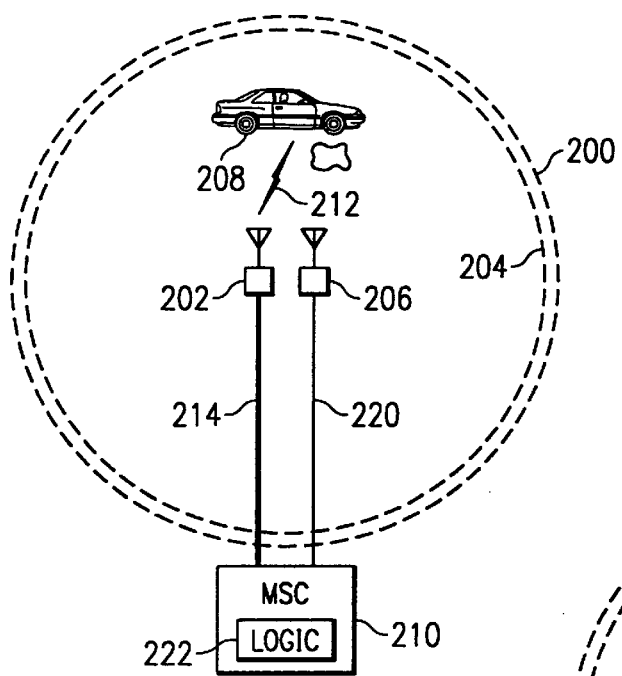
FIGS. 2A–2C illustrate hard handoff of a call from a CDMA cell site to an AMPS cell site in accordance with the teaching of the present invention.
Figure 2B:
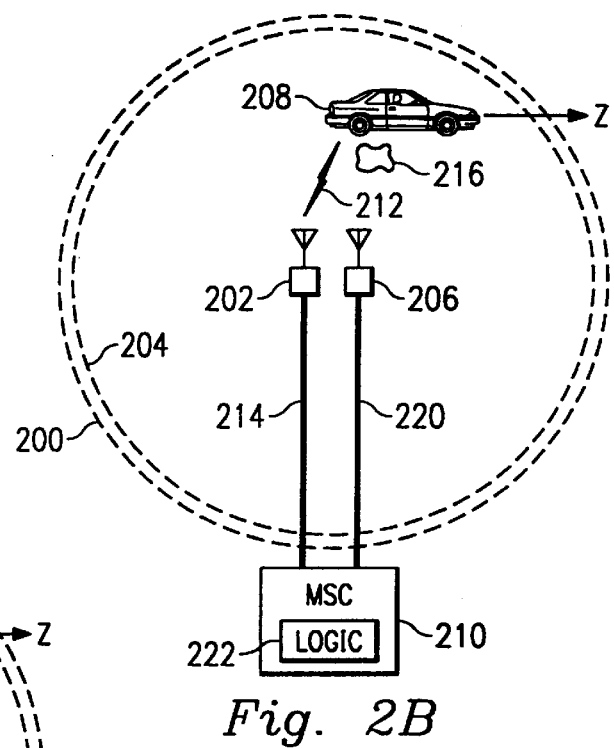
Figure 2C:
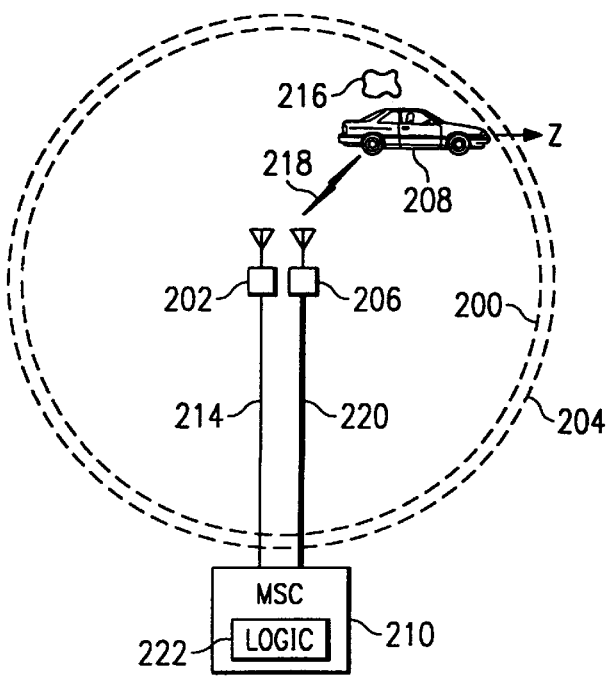

Referring now to FIGS. 2A–2C, hard handoff of a call from a CDMA cell site to an AMPS cell site in accordance with the features of the present invention will be shown and described. In particular, a CDMA cell 204 serviced by a CDMA cell site 206 is overlaid on an AMPS cell 200 serviced by an AMPS cell site 202. It will be recognized that although the CDMA cell 204 is shown as covering the entire geographical area covered by the AMPS cell 200, this will not necessarily be the case. On the contrary, it is possible that only portions of the areas covered by the cells 200, 204, will be the same or that the AMPS cell 200 will cover a greater area than the CDMA cell 204. In addition, it will also be recognized that areas covered by the cells 200, 204, will most likely not be round, as represented in the drawings. Moreover, it will be recognized that the cells 200, 204, are not necessarily the same size, i.e., one may cover a greater area than the other. Accordingly, the term "overlaid" will be used to encompass any of these situations in which a CDMA cell, such as the cell 204, covers at least some of the same geographical area as covered by an AMPS cell, such as the cell 200.

As shown in FIG. 2A, a mobile unit 208 is in communication with an MSC 210 via an RF link 212 between the mobile unit and the CDMA cell site 206 and a hardware link 214 between the CDMA cell site and the MSC. Referring to FIGS. 2B and 2C, as the mobile unit 208 continues to move in a direction indicated by an arrow Z, an obstruction 216 begins to interfere with the RF link 212 between the mobile unit and the CDMA cell site 206. Accordingly, as will be described in detail below, once the call quality has degraded to a point at which it is likely that the call will eventually be dropped, the links 212 and 214 are terminated and an RF link 218 between the AMPS cell site 202 and the mobile unit 208 is established, such that the mobile unit is in communication with the MSC 210 via the RF link 218 and a hardware link 220 between the AMPS cell site and the MSC.

Although cell sites are shown in FIGS. 2A–2C as being connected by a single MSC 210, it will be recognized that cell sites may be connected by more than one MSC connected to one another via appropriate links.

A good handoff trigger must correctly identify an upcoming call drop a high percentage of the time. Such detection must be accomplished sufficiently early so that the quality of the forward link is good enough for the mobile unit to receive the handoff message with a high degree of certainty. Another trigger characteristic is that the triggering algorithm should not be too sensitive, or it will falsely trigger too often, causing unnecessary handoffs to the AMPS network and unnecessary CDMA/AMPS messaging.

The following have been identified as good indicators of RF link quality; therefore, by monitoring their values, one can determine when the CDMA call is in RF trouble:

Forward Link Erasures ("$FER_{forward}$"), which is a measure of the quality of the forward link. An erasure is equivalent to one bad frame of data.

Reverse Link Erasures ("$FER_{reverse}$"), which is a measure of the quality of the reverse link. An erasure is equivalent to one bad frame of data.

Forward Traffic Channel Gain ("TCG"), which is a measure of the power being sent to the mobile unit on the forward link.

Reverse EB/NO ("EBNO"), which is a ratio of energy per bit to noise power spectral density used in power control to ensure that the reverse link meets the target frame error rate.

In accordance with the present invention, logic 222 is included in the MSC 210 for causing the MSC to trigger a handoff from the CDMA cell site 200 to the AMPS cell site 202 if at any given time t any one of the following is true:

(1) $FER_{forward}(t) > FER_{max\_forward}$ (2) $FER_{reverse}(t) > FER_{max\_reverse}$ (3) $FER_{forward}(t) > FER_{max\_forward\_2}$ and $TCG(t) > TCG_{max}$ (4) $FER_{reverse}(t) > FER_{max\_reverse\_2}$ and $EBNO(t) > EBNON_{max}$ where:

t represents a discrete unit of time;

$FER_{forward}(t)$ is a measure of the forward frame error rate over a given window of time and is equal to:

$$(1/N)(X_{forward}(t)) + ((N-1)/N)(FER_{forward}(t-1));$$

$FER_{max\_forward}$ is a configurable parameter for the maximum allowable FER on the forward link;

$FER_{reverse}(t)$ is a measure of the reverse frame error rate over a given window of time and is equal to:

$$(1/N)(1/((Target\ FER(t-1)/TargetFER(fullrate))(X_{reverse}(t)) + ((N-1)/N)(FER_{reverse}(t-1));$$

$FER_{max\_reverse}$ is a configurable parameter for the maximum allowable FER on the reverse link;

$FER_{max\_forward\_2}$ is a configurable parameter for a moderate FER on the forward link;

$FER_{max\_reverse\_2}$ is a configurable parameter for a moderate FER on the reverse link;

N is equal to averaging window size;

$X_{forward}(t)$ is equal to frame error at time t on the reverse link. This is given as a percentage, with two possible values—error or no error;

$X_{reverse}(t)$ is equal to frame error at time t on the reverse link. This is given as a percentage with two possible values—error or no error;

TargetFER(t) is equal to target FER for whatever rate that the frame at time t was sent;

TCG(t) is equal to the traffic channel gain at time t on the forward link;

$TCG_{max}$ is a configurable parameter for the maximum allowable traffic channel gain;

EBNO(t) is equal to the EB/NO at time t on the reverse link; and $EBNO_{max}$ is a configurable parameter for the maximum allowable EB/NO.

It will be recognized by those skilled in the art that a calculation of $FER_{forward}$ and $FER_{reverse}$ can be easily performed using the "good frame/bad frame" indication as defined in "IS-95 Mobile Station-Land Station Standard for Dual-Mode Wideband Spread Spectrum Cellular Systems" (hereinafter "IS-95"), which is hereby incorporated by reference in its entirety, under Section 1.1.1 "Terms". Similarly, EB (energy per bit) is a recognized parameter defined in the above-referenced "Terms" section of IS-95. NO (noise) is the noise power spectral density and TCG is the power at which the traffic channel is broadcast.

Once any one of the above conditions (1)–(4) are met, indicating that the call is likely to be dropped, a CDMA-to-AMPS handoff will be initiated.

In this manner, handoff of a call from the CDMA cell site 206 to the AMPS cell site 202 can be delayed until it is necessary to handoff the call to prevent the call quality from being significantly degraded or the call from being dropped altogether.

It will be recognized that the parameters $FER_{forward\_max}$, $FER_{reverse\_max}$, $FER_{forward\_max2}$, $TCG_{max}$, and $EBNO_{max}$ are programmable and can be set by a CDMA service provider according to whether the provider is more concerned with ensuring that calls are successfully handed off from CDMA to AMPS prior to the call being terminated, in which case the parameters would be set low, such that the call is handed off at the first indication that the quality of the call is being degraded, or with retaining the call on CDMA, and thus continuing to charge for the call, as long as possible, in which case the parameters would be set high.

Figure 3:
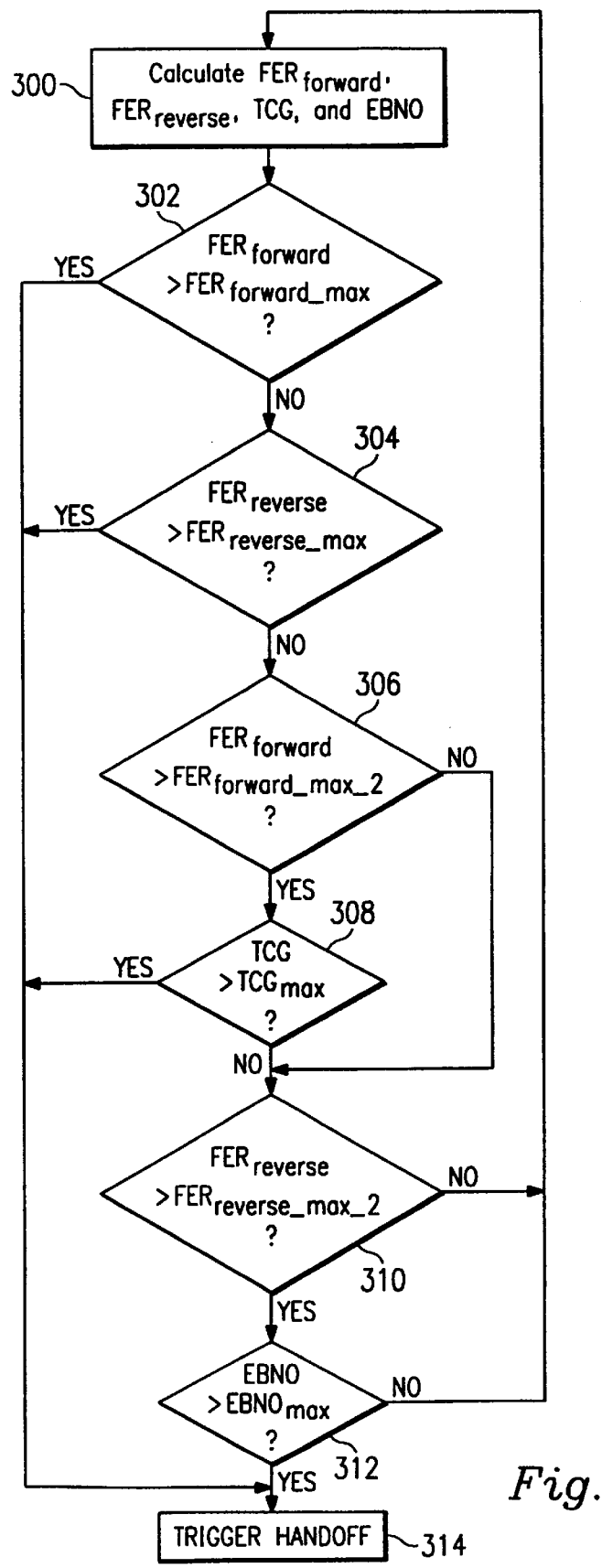
FIG. 3 is a flowchart of the operation of the present invention for triggering handoff of a call from a CDMA cell site to an AMPS cell site.

FIG. 3 is a flowchart of the operation of the present invention, which is implemented by the MSC 210 in accordance with the logic 222 stored therein. In step 300, the current values of $FER_{forward}$, $FER_{reverse}$, TCG and EBNO are calculated. In step 302, a determination is made whether $FER_{forward}$ is greater than $FER_{max\_forward}$. If not, indicating that condition (1) above has not been met, execution proceeds to step 304, in which a determination is made whether $FER_{reverse}$ is greater than $FER_{max\_reverse}$. If not, indicating that condition (2) above has not been met, execution proceeds to step 306, in which a determination is made whether $FER_{forward}$ is greater than $FER_{max\_forward2}$. If so, indicating that the first part of condition (3) has been met, execution proceeds to step 308, in which a determination is made whether TCG is greater than $TCG_{max}$. If not, indicating that the second part of condition (3) has not been met, execution proceeds to step 310. Similarly, if in step 306, a determination is made that $FER_{forward}$ is not greater than $FER_{max\_forward\_2}$, indicating that the first part of condition (3) has not been met, execution proceeds to step 310.

In step 310, a determination is made whether $FER_{reverse}(t)$ is greater than $FER_{max\_reverse2}$. If so, indicating that the first part of condition (4) above has been met, execution proceeds to step 312, in which a determination is made whether EBNO(t) is greater than $EBNO_{max}$. If not, indicating that the second part of condition (4) above has not been met, execution returns to step 300. Similarly, if in step 310, it is determined that $FER_{reverse}(t)$ is less than $FER_{max\_reverse2}$, execution also returns to step 300.

If in step 312 it is determined that EBNO is greater than $EBNO_{max}$, indicating that both parts of condition (4) above have been met, execution proceeds to step 314, in which a hard handoff of a call from a CDMA cell site, such as the cell site 202, to an AMPS cell site, such as the cell site 206, is triggered. Similarly, if in step 302 it is determined that $FER_{forward}$ is greater than $FER_{forward\_max}$, indicating that condition (1) above has been met, or if in step 304 it is determined that $FER_{reverse}$ is greater than $FER_{reverse\_max}$, indicating that condition (2) above has been met, or if in step 308 it is determined that TCG is greater than $TCG_{max}$, indicating that both parts of condition (3) above have been met, execution proceeds to step 314, in which a hard handoff of the call is triggered.

Although an illustrative embodiment of the invention has been shown and described, other modifications, changes, and substitutions are intended in the foregoing disclosure. For example, it is possible that the foregoing equations may be altered such that a handoff is triggered when a parameter is less than a predetermined minimum value, rather than greater than a predetermined maximum value and it is intended that the appended claims be construed to cover such a situation. In addition, the above-described handoff trigger of the present invention could be used to trigger handoff of a call from a first CDMA cell site to a second CDMA cell site, as well as from a CDMA cell site to an AMPS or other type of cell site on which the CDMA cell site is not overlaid. In these situations, although the way in which the call is handed off from one cell site to the other may differ, the triggering of such a handoff would be accomplished according to the teachings set forth herein. Accordingly, it is appropriate that the appended claims be construed broadly and in a manner consistent with the scope of the invention.

What is claimed is:

1. A method for triggering handoff of a call from a first cell site to a second cell site, the method comprising:

measuring a first parameter of said call;

comparing said first parameter with a predetermined value for said first parameter; and triggering a handoff of said call from said first cell site to said second cell site responsive to said first parameter deviating from said predetermined value for said first parameter at least a first predetermined amount;

wherein said first parameter is selected from a group consisting of forward link erasures and reverse link erasures.

2. The method of claim 1 further comprising:

prior to said triggering, measuring a second parameter of said call; and comparing said second parameter with a predetermined value for said second parameter;

wherein said triggering is performed responsive to both said first parameter deviating from said predetermined value for said first parameter at least said first predetermined amount and said second parameter deviating from said predetermined value for said second parameter at least a second predetermined amount; and wherein said second parameter is selected from a group consisting of traffic channel gain and energy per bit to noise power spectral density ratio.

3. The method of claim 1 wherein a first cell served by said first cell site is overlaid on a second cell served by said second cell site.

4. The method of claim 1 wherein said first cell site is a CDMA cell site and said second cell site is an AMPS cell site.

5. The method of claim 1 wherein said first and second cell sites are CDMA cell sites.

6. A method for triggering handoff of a call from a first cell served by a first cell site to a second cell served by a second cell site, the method comprising:

measuring a first parameter of said call;

comparing said first parameter with a predetermined maximum value for said first parameter; and triggering a handoff of said call from said first cell site to said second cell site responsive to said first parameter being greater than said predetermined maximum value for said first parameter;

wherein said first parameter is selected from a group consisting of forward link erasures and reverse link erasures.

7. The method claim 6 further comprising:

prior to said triggering, measuring a second parameter of said call; and comparing said second parameter with a predetermined maximum value for said second parameter;

wherein said triggering is performed responsive to both said first parameter being greater than said predetermined maximum value for said first parameter and said second parameter being greater than said predetermined maximum value for said second parameter; and wherein said second parameter is selected from a group consisting of traffic channel gain and energy per bit to noise power spectral density ratio.

8. The method of claim 6 wherein said second cell is an AMPS cell and said first cell is a CDMA cell overlaid on said AMPS cell.

9. The method of claim 6 wherein said first and second cell sites are CDMA cell sites.

10. In a cellular communication system comprising at least one CDMA cell overlaid on an AMPS cell, a method for triggering handoff of a call from a CDMA cell site serving said CDMA cell to an AMPS cell site serving said AMPS cell, the method comprising:

measuring a plurality of parameters of said call;

comparing each of said parameters with a predetermined maximum value for said parameter; and triggering handoff of said call from said CDMA cell site to said AMPS cell site responsive to at least one of said plurality of parameters being greater than the predetermined maximum value therefore, wherein said triggering further comprises triggering handoff of said call when both said forward link erasures are greater than a predetermined maximum value for said forward link erasures and said traffic channel gain is greater than a predetermined maximum value for said traffic channel gain.

11. In a cellular communication system comprising at least one CDMA cell overlaid on an AMPS cell, a method for triggering handoff of a call from a CDMA cell site serving said CDMA cell to an AMPS cell site serving said AMPS cell, the method comprising:

measuring a plurality of parameters of said call;

comparing each of said parameters with a predetermined maximum value for said parameter; and triggering handoff of said call from said CDMA cell site to said AMPS cell site responsive to at least one of said plurality of parameters being greater than the predetermined maximum value therefore;

wherein said plurality of parameters comprise forward link erasures, reverse link erasures, traffic channel gain and energy-per-bit to noise power spectral density ratio;

wherein said triggering further comprises triggering handoff of said call when both said reverse link erasures are greater than a predetermined maximum value for said reverse link erasures and said energy-per-bit to noise power spectral density ratio is greater than a predetermined maximum value for said energy-per-bit to noise power spectral density ratio.

12. Apparatus for triggering handoff of a call from a first cell site to a second cell site, the apparatus comprising:

means for measuring a first parameter of said call;

means for comparing said first parameter with a predetermined value for said first parameter; and means for triggering a handoff of said call from said CDMA cell site to said AMPS cell site responsive to said first parameter deviating from said predetermined value for said first parameter at least a first predetermined amount;

wherein said first parameter is selected from a group consisting of forward link erasures and reverse link erasures.

13. The apparatus of claim 12 further comprising:

means for measuring a second parameter of said call; and means for comparing said second parameter with a predetermined value for said second parameter;

wherein said means for triggering comprises means for triggering handoff of said call responsive to both said first parameter deviating from said predetermined value for said first parameter at least said first predetermined about and said second parameter deviating from said predetermined value for said second parameter at least a second predetermined amount; and wherein said second parameter is selected from a group consisting of traffic channel gain and energy per bit to noise power spectral density ratio.

14. The apparatus of claim 12 wherein said first cell site is a CDMA cell site and said second cell site is an AMPS cell site.

15. The apparatus of claim 14 wherein a CDMA cell served by said CDMA cell site is overlaid on an AMPS cell served by said AMPS cell site.

16. The apparatus of claim 12 wherein said first and second cell sites are both CDMA cell sites.

17. A mobile switching center ("MSC") for use in a cellular system for triggering handoff of a call from a first cell site to a second cell site, the MSC comprising:

logic for measuring a first parameter of said call;

logic for comparing said first parameter with a predetermined value for said first parameter; and logic for triggering a handoff of said call from said CDMA cell site to said AMPS cell site responsive to said first parameter deviating from said predetermined value for said first parameter at least a first predetermined amount;

wherein said first parameter is selected from a group consisting of forward link erasures and reverse link erasures.

18. A mobile switching center ("MSC") for use in a cellular system for triggering handoff of a call from a first cell site to a second cell site, the MSC comprising:

logic for measuring a first parameter of said call;

logic for comparing said first parameter with a predetermined value for said first parameter;

logic for triggering a handoff of said call from said CDMA cell site to said AMPS cell site responsive to said first parameter deviating from said predetermined value for said first parameter at least a first predetermined amount;

logic for measuring a second parameter of said call; and logic for comparing said second parameter with a predetermined value for said second parameter;

wherein said logic for triggering further comprises logic for triggering handoff of said call responsive to both said first parameter deviating from said predetermined value for said first parameter at least a first predetermined amount and said second parameter deviating from said predetermined value for said second parameter at least a second predetermined amount.

19. The MSC of claim 18 wherein said second parameter is selected from a group consisting of traffic channel gain and energy per bit to noise power spectral density ratio.

20. The MSC of claim 17 wherein said first cell site is a CDMA cell site and said second cell site is an AMPS cell site.

21. The MSC of claim 20 wherein a CDMA cell served by said CDMA cell site is overlaid on an AMPS cell served by said AMPS cell site.

22. The MSC of claim 17 wherein said first and second cell sites are CDMA cell sites.

* * * * *